United States Patent [19]
Eschbach

[11] Patent Number: 5,956,470
[45] Date of Patent: Sep. 21, 1999

[54] TEXT QUALITY ENHANCEMENT VIA RESOLUTION ENHANCEMENT TECHNIQUE BASED ON SEPARATING JAGGEDNESS DETECTION AND FILTERING

[75] Inventor: Reiner Eschbach, Webster, N.Y.

[73] Assignee: Xerox Corporation, Stamford, Conn.

[21] Appl. No.: 08/937,406

[22] Filed: Sep. 25, 1997

[51] Int. Cl.$^6$ .............................. G06K 15/02; G06K 9/44; G06T 5/00; H04N 1/409
[52] U.S. Cl. ........................... 395/109; 382/260; 382/269
[58] Field of Search ...................... 382/269, 264, 382/266; 358/298; 395/109, 260

[56] References Cited

U.S. PATENT DOCUMENTS

| | | |
|---|---|---|
| 4,280,144 | 7/1981 | Bacon . |
| 4,437,122 | 3/1984 | Walsh et al. . |
| 4,670,039 | 6/1987 | Sjogren . |
| 4,847,641 | 7/1989 | Tung . |
| 5,327,260 | 7/1994 | Shimomae et al. ..................... 358/448 |
| 5,650,858 | 7/1997 | Lund ....................... 358/298 |

*Primary Examiner*—Scott Rogers

[57] ABSTRACT

A method of separating the detection of text/line jaggedness via a resolution enhancement filter from the actual operation of smoothing image jaggedness or flaws is presented. The advantage of this system is that jaggedness detection can be easily done via established resolution enhancement techniques on a binary signal, but the smoothing can operate on a full color 24 or 32 bit system. This method also performs resolution enhancement or smoothing operations on multi-bit pixel depth data wherein separation is first conducted to detect image jaggedness and, secondly, smoothing operations are performed. In one embodiment of the invention, input data can be comprised of a byte stream connected to a mask FIFO through an ink filter, and to data FIFOs. Pre-filters in this case are connected to additional FIFOs and a resolution enhancement filter to receive a jaggedness detection signal. Processed data is then passed to a buffer where the resolution enhancement filter provides a signal to a halftoner indicating a switch has occurred in the halftone structure of the image. The halftoner processes the data from buffer under control of the resolution enhancement filter and eventually passes the data to the IOT.

10 Claims, 5 Drawing Sheets

TEXT QUALITY ENHANCEMENT VIA RESOLUTION ENHANCEMENT TECHNIQUE BASED ON SEPARATING JAGGEDNESS DETECTION AND FILTERING

FIELD OF THE INVENTION

The invention is generally related to resolution enhancement techniques for image processing applications and, more particularly, the invention is related to a resolution enhancement technique (RET) where jaggedness detection and processing is performed in independent separation and smoothing steps thereby enabling efficient RET implementation in multi-level systems.

BACKGROUND OF THE INVENTION

Image information, be it color or black and white, is commonly generated in a bitmap format at a particular scale, orientation, and resolution K×L×b , corresponding to a desired printer output, where K is a number of spots per unit of length in one dimension, L is a number of spots per unit length in the other dimension, and b is the depth of each pixel, in number of levels. This bitmap is present for every color separation of the output device, i.e., 4 bitmaps for a 4-color output device, 3 for a 3-color, 2 for a 2-color and 1 for a black and white output device. In a common example of a black and white output, image data comprising a bitmap to be printed is provided to a printer suitable for printing at 300 spots per inch (spi) in both dimensions, at a one bit depth giving 2 levels. Many considerations drive this single selection of resolution, including the desirability of providing only a limited number of fonts (alphanumeric bitmaps) so as to use only a limited amount of storage space. Common software packages available on personal computers or for operation of input scanners for document creation also usually provide only a single resolution output.

Increasingly, the resolution available from printers varies over a wider range of choices. Printer resolutions are available over a range, for example, from less than 200 spi to more than 600 spi. Resolutions vary for a number of reasons, generally related to the quality of the output image and/or the data path architecture potentially distinguishing between text and image; contour data and gradation data; and the like.

It is a common practice to implement conversion of a bitmap of first resolution K×L×b to a bitmap of second resolution M×N×d through simple pixel level and raster level operations, such as pixel doubling. When resolution is changed by integer multiples, the resolution conversion can be achieved by pixel replication. Pixel replication, however, does not best use the capabilities of higher resolution output devices and also does not give the best data merging function for a segmented data path that has to combine data of different resolutions or bit depths. For example, high frequency text and graphics data, foreground color data, background color data and low frequency sample color data will typically be included in a single color document. One way to process these various forms of data is to provide each type at a different data channel, and use a binary mask to identify the text outline at high resolution and to use the background and foreground color channels to identify the text color at low resolution. While this solution results in an overall reduction in the amount of data that is required to describe a document, using such a scheme makes it difficult to reproduce anti-aliased or gray-edged text. Hence in performing resolution conversion with a higher resolution output device it is desirable to perform a smoothing operation even if the output device has only a higher resolution than a single of the input image components if the image is described in a segmented way.

Alternatively, more elaborate methods than pixel replication have been developed to facilitate resolution conversion, some of which are described U.S. Pat. No. 5,282,057 to Mailloux and Coward, entitled "Bit-Map Image Resolution Converter," and U.S. Pat. No. 5,410,615 to Mailloux, entitled "Bit-Map Image Resolution Converter Compensating for Write-White Xerographic Laser Printing," the pertinent portions of each patent being incorporated herein by reference. Each of the above-mentioned patents contemplates a method of magnifying, by a predetermined magnification factor (n), original image pixels in two dimensions. The method includes the steps of selecting an original image pixel, as well as determining the binary state of both the selected original image pixel and all immediately surrounding original image pixels. Additionally, the selected original image pixel is expanded into an n×n array of magnified image pixels to represent the magnification of the selected original image pixel. Finally, a binary state is assigned to each pixel in the array of magnified image pixels according to the pattern of binary signals previously determined for the selected original image pixel and all immediately surrounding original image pixels. In the preferred embodiments of these patents, the assignment of the binary states to the pixels in the array of magnified image pixels is made according to a set of state determination rules.

Employing sophisticated resolution conversion techniques does not insure that the resulting output image will have a desirable appearance. For instance, the output image can be excessively blocky and/or contain noticeable "jaggies." Hence, smoothing operations are sometimes used in conjunction with the conversion or scaling of the image. Through use of the state determination rules in the techniques of the above-mentioned applications, smoothing operations are achieved. For example, the method of the '057 patent ("Bit-Map Image Resolution Converter") permits such operations as smoothing of edges, smoothing of half-bitting effects and smoothing of lines. Moreover, the method of the '615 patent ("Bit-Map Image Resolution Converter Compensating for Write-White Xerographic Laser Printing") permits enhancing of single bits in printing and compensating for loss of resolution in write-white printing.

The following patents also disclose techniques for achieving a higher degree of smoothing in the output image:

U.S. Pat. No. 4,280,144
Inventor: Bacon
Issued: Jul. 21, 1981
U.S. Pat. No. 4,437,122
Inventors: Walsh et al.
Issued: Mar. 13, 1984
U.S. Pat. No. 4,670,039
Inventors: Neil et al.
Issued: Jul. 7, 1987
U.S. Pat. No. 4,847,641
Inventor: Tung
Issued: Jul. 11, 1989

U.S. Pat. No. 4,280,144 discloses a coarse scan/fine print algorithm. In particular the algorithm is adapted for use in a scheme in which a pixel having two levels of information is transmitted and then reconstructed into a pixel having four levels of information.

U.S. Pat. No. 4,437,122 discloses a technique for enhancing the resolution and quality of characters of a system receiving information initially in the form of image data. Through use of the technique, images can be smoothed by appropriately processing unenhanced input pixels; that is, an array of subpixels can be mapped on to a selected unenhanced pixel and the subpixels of the array can be outputted selectively as black or white to permit smoothing of the resulting output image.

U.S. Pat. No. 4,670,039 discloses a method for smoothing the display of contiguous parallel line segments in a manner to reduce the discontinuities that occur near the ends of the line segments. Smoothing is achieved by adding auxiliary dots of a lesser diameter below the larger main dots forming a first line segment in a given row and adding the same size auxiliary dots above the main dots of an adjacent line segment when the latter are in a row below the given row. The smoothing operation is optimized for multiple cases and line orientations and more than three different dot sizes can be used in the smoothing operation.

U.S. Pat. No. 4,847,641 discloses a technique for enhancing the printing of bit mapped images by piecewise matching of the bitmap with predetermined stored templates or patterns to detect occurrence of preselected bitmap features. Whenever a match occurs, an error signal is generated to produce a corrected or compensated dot or cell to replace a matched bitmap cell. In this manner the printed image of the desired bitmap image is enhanced by substituting in the original bitmap image on a piece-by-piece or cell-by-cell basis, the cells of the preselected feature with error compensated sub-cells.

One system in which image components are represented in different resolutions or bit depths is taught in U.S. Pat. No. 5,225,911 to Buckley and Rumph. U.S. Pat. No. 5,225,911 shows a circuit for enabling the raster display of text or line art in one constant color against a background. The circuit has four channels, one each for constant colors, continuous-tone images, image masks, and instructions. The four channels carry data of potentially different resolution and bit depth that is combined at a final multiplexer.

Advanced print engines in current system configurations might use imagers having different data channels for text, graphics and color as described in the '911 patent. In such an imager, different data channels exist for high frequency text and graphics (mask), foreground color, background color, low frequency sample color data, etc. One of the advantages of those systems is the efficient use of image data for describing color documents. For example, yellowish text on a bluish background does not need to be described using 24 bits for every pixel at the resolution needed to correctly represent the text. Instead a binary mask can be used determining the text outline at high resolution and the background, and foreground color channels can be used to determine the text color at low resolution resulting in an overall reduction in data needed to describe the page.

None of the above references specifically contemplates a technique for resolution conversion or scaling image data in which different image components might be represented at different resolutions or bit depths.

Alternatively, some systems use a multi-stage representation of the image data, where in the first rendering stage the data is represented at one resolution and bit depth and in a second stage is typically described by higher resolution and reduced bit depth. In such system the described invention can be used advantageously to modify the actual mapping between the two representations by altering the halftoning method, incorporating a smoothing step.

Encoding methods, commonly called halftoning, are used to reduce the number of quantization levels per pixel in a digital image while maintaining the gray appearance of the image at normal reading distance. Halftoning techniques are widely employed in the printing and display of digital images. Halftoning techniques are necessary because the physical processes involved are binary in nature or the processes have been restricted to binary operation for reason of cost, speed-memory, or stability in the presence of process fluctuations. Examples of such processes are: most printing presses; ink jet printers; binary cathode ray tube displays; and laser xerography.

A standard method of quantizing gray level pixel values to binary level pixel values is through dithering or screening processes. In such arrangements, over a given area having a number of gray pixels therein, each pixel value of an array of gray level pixels within the area is compared to one of a set of pre-selected thresholds as taught, for example, in U.S. Pat. No. 4,149,194 to Holladay. The effect of such an arrangement is that, for an area where the image is gray, some of the thresholds within the screen matrix will be exceeded, i.e., the image value at that specific location is larger than the values stored in the dither matrix for that same location where the intensity is less than the threshold the pixel is colored black, while the remaining elements are allowed to remain white, dependent on the actual physical quantity described by the data. The effect of the distribution of black and white over the halftone cell is integrated by the human eye as gray.

A trade-off is required between the number of gray level increments representable by a screen cell, versus the size or frequency of the cell. While it is desirable to have as many gray levels as possible representable by a screen cell, such a requirement increases the size of the cell until its repetition across an image becomes visible. However, with a smaller cell, which can be repeated at high frequency across a page, only a relatively small number of gray levels can be represented. Consequently, it is desirable to use different halftone cells for different image components, as described in a technique by David Rumph et al. described in a patent application, Ser. No. 08/245,230, filed May 18, 1996.

A feature of this invention provides a method of improving image quality that smoothes the image data when going from one resolution (bit depth combination) to another resolution (bit depth combination) by separating the detection of the jaggedness from the processing required for smoothing.

None of the above cited references offer an efficient way to perform a RET or smoothing operation on data that has a multi-bit pixel depth. It is therefor a convenient feature of the present invention to provide a method that efficiently performs an RET or smoothing operation on multi-bit pixel depth data, using a separation for detecting the jaggedness of the data and performing the actual smoothing operation.

All of the references cited herein are incorporated by reference for their teachings.

SUMMARY OF THE INVENTION

In order to overcome the shortcomings discussed above, a method of separating the detection of text/line jaggedness via an resolution enhancement filter from the actual operation of smoothing the jaggedness is presented. This implementation is a dramatic simplification over RET approaches to full color data. The advantage of this system is that the jaggedness detection can be done via established resolution enhancement techniques on a binary signal, but the smoothing can operate on a full color 24 or 32 bit system. This method efficiently performs resolution enhancement or smoothing operations on multi-bit pixel depth data wherein separation is first conducted to detect image jaggedness and, secondly, smoothing operations are performed.

According to the invention, a method for resolution enhancement is provided wherein different image components might be represented at different resolutions or bit depths. The method comprises separating the detection of image jaggedness from the processing required for smoothing said an image, where:

input image data enters a mask first in first out (FIFO) through an ink filter and also enters data FIFOs;

a resolution enhancement filter connected to the data FIFOs receives the image input data;

image data is processed through a buffer to an image enhancement module wherein the resolution enhancement filter provides image jaggedness detection signals detected from the input image data, and the image jaggedness detection signals signal the image enhancement module that the image input image data requires a switch in halftone structure; and the image enhancement module processes the image data from the buffer under the direction of the resolution enhancement filter, resulting in enhanced image data.

According to the disclosed method, output of the data multiplexer, which may, for example, consist of individual separations at 8 bit depth @400 spi, plus a "mask" or similar Tag information @400 spi 1 bit deep, is passed into a FIFO 20 that is connected to a jaggedness detection unit whose output is a signal to filters indicating a need for processing or the absence of the need for processing. The filters operate on the input data and pass the resultant data through to an output buffer block and then subsequently to an IOT.

Input data can be comprised of a byte stream connected to a mask FIFO through an ink filter, and to data FIFOs. Pre-filters in this case are connected to additional FIFOs and a resolution enhancement filter to receive a jaggedness detection signal. Processed data is passed to the buffer where the resolution enhancement filter also provides a signal to a halftoner indicating a switch has occurred in the halftone structure of the image. The halftoner processes the data from buffer under control of the resolution enhancement filter and eventually passes the data to the Image Output Terminal (IOT).

The RET circuitry of the invention is only used to signal a processing step and not to perform the actual processing. In this way, the problem of using RET on 8 bit/sep data is eliminated and existing algorithms can be used.

Accordingly, the system comprises: a) an input image data receiving means for receiving image data for jaggedness detection and smoothing; b) a jaggedness detection unit whose output signals an image enhancement unit of a need for enhancing or the absence of the need for enhancing of an image based on said input image data; an image enhancement unit for providing image enhancement adjustments to said image based on input from said jaggedness detection unit; and a output buffer block wherein image data from said input image data means and any enhancements for said image enhancement unit are assembled into output image format.

Advantages of the invention are the provision of enhanced image quality by the reduction of image jaggedness, and the elimination of system hardware modifications to accomplish image quality displaying reduced jaggedness. The RET circuitry of the invention is only used to signal a processing step and not to perform the actual processing. In this way, the problem of using RET on 8 bit/sep data is eliminated and existing algorithms can be used.

Other advantages and salient features of the invention will become apparent from the detailed description which, taken in conjunction with the drawings, disclose the preferred embodiments of the invention.

DESCRIPTION OF THE DRAWINGS

The preferred embodiments and other aspects of the invention win become apparent from the following detailed description of the invention when read in conjunction with the accompanying drawings which are provided for the purpose of describing embodiments of the invention and not for limiting same, in which.

DETAILED DESCRIPTION OF THE INVENTION

Figure 1:
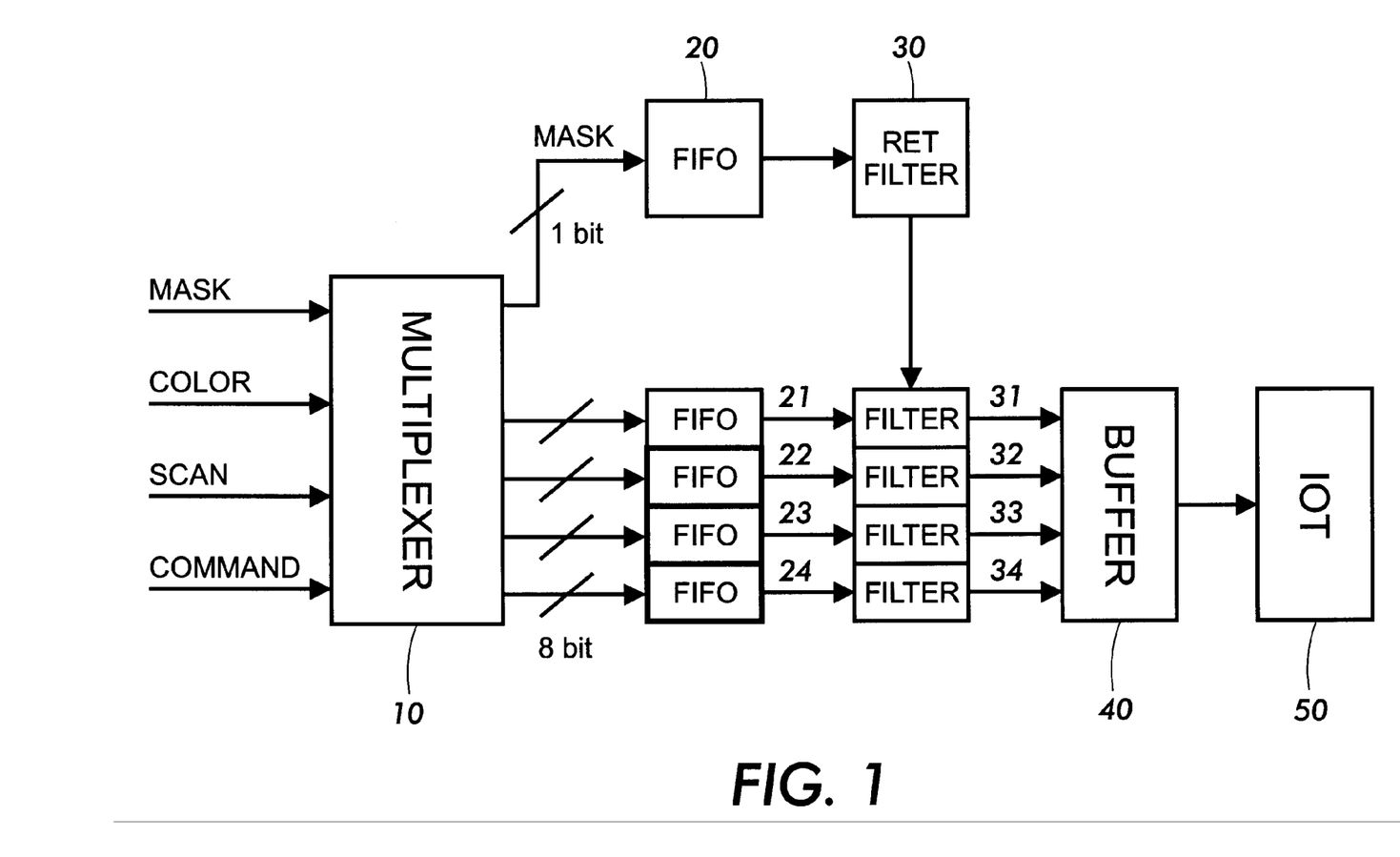
FIG. 1 is a system block diagram of the invention.

Referring to FIG. 1 which depicts an embodiment of the invention, the output of the data multiplexer 10 consists of individual separations at 8 bit depth @400 spi, plus a "mask" or similar Tag information @400 spi 1 bit deep. The FIFOs 20 to 24 in this implementation would hold enough scanlines to cover the RET filter, and/or data filter, where one should understand that the number of scanlines used in FIFO 20 for detecting jaggedness might optionally be different from the number of scanlines used in FIFOs 21 to 24 for smoothing the data. FIFO 20 is connected to the jaggedness detection unit labeled RET Filter 30 whose output is a signal to the filters 31 to 34 indicating the need for processing or the absence of the need for processing. The jaggedness filter 30 preferably consists of the templates constructed similar to the ones described in U.S. Pat. No. 4,437,122 or described U.S. Pat. No. 5,282,057, or the like, but it should be noted that algorithmic descriptions of jaggedness can also be implemented in RET Filter 30. The filters 31 to 34 operate on the input data and pass the resultant data through to output buffer block 40 and subsequent IOT 50. In this example no control of the output halftone was assumed for the RET Filter 30.

Figure 2:
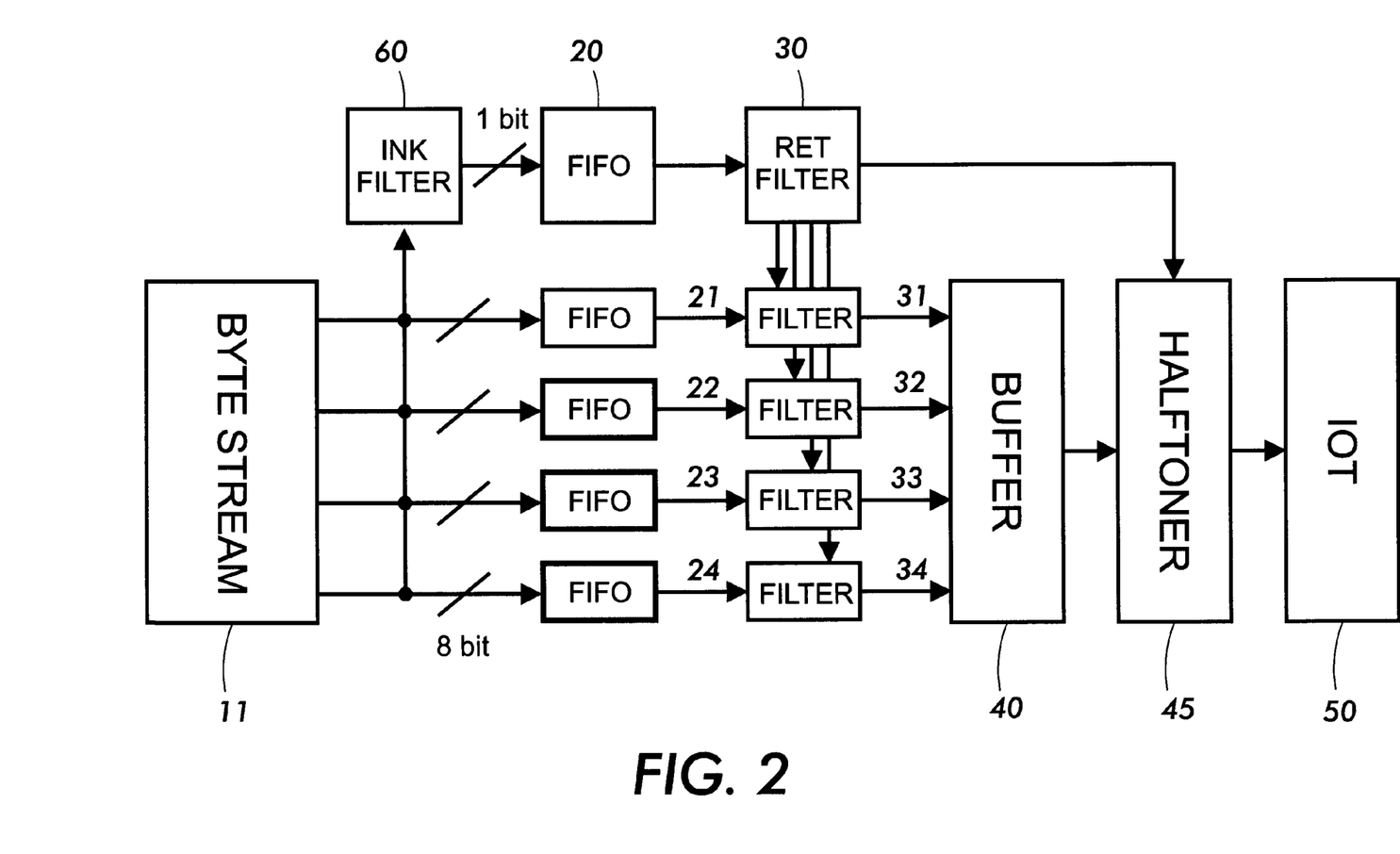
FIG. 2 is a system block diagram of an alternate implementation of the invention.

FIG. 2 shows another embodiment of the invention wherein the method is implemented using identical numbers for identical functions, but where the input data is comprised of an byte stream 11 rather than a multiplexer. The byte stream is connected to the mask FIFO 20 through an ink filter 60, and to the data FIFOs 21 to 24. The filters 31 to 34 are connected to FIFOs 21 to 24 and RET filter 30 to receive the jaggedness detection signal. The processed data is passed to buffer 40 in much the same manner as illustrated in FIG. 1. RET filter 30 additionally provides a signal to halftoner 45 indicating a switch in the halftone structure. Halftoner 45 processes the data from buffer 40 under control of RET filter 30 and passes the data to IOT block 50.

Figure 3:
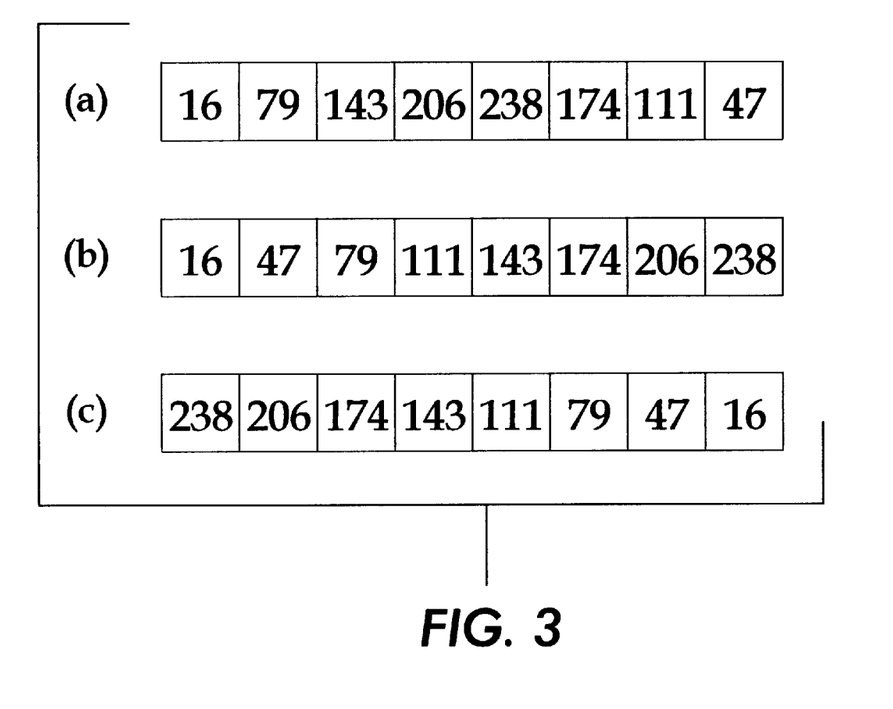
FIG. 3 is an example of a halftone screen set.
Figure 4:
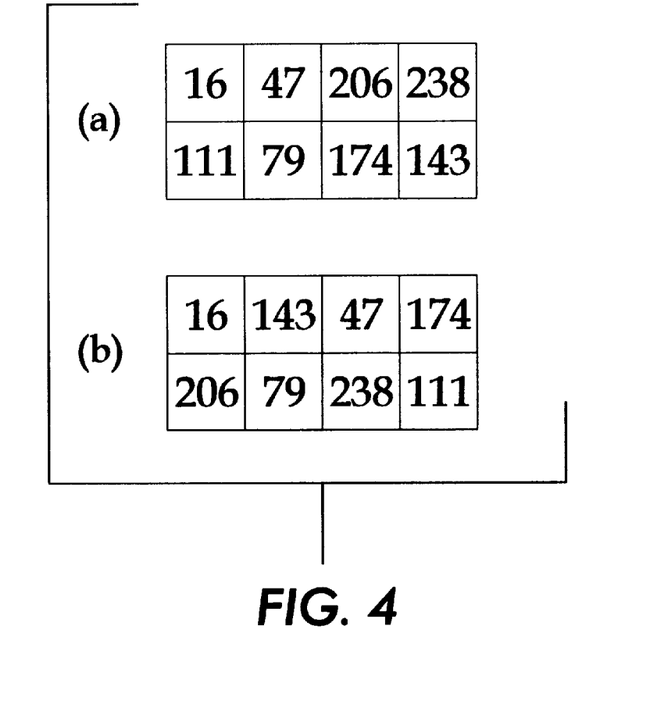
FIG. 4 is an example of an alternate halftone screen set.

In contrast to standard RET applications, the RET circuitry 30 is only used to signal the processing step and not to perform the actual processing. In this way, the problem of using RET on 8 bit/sep data is eliminated and existing algorithms can be used. Additionally, the operation on the data is reduced to a simple filtering. The filtering can be implemented as a simple linear filtering (e.g., a conditional 3×3 blur-type filter) or a more complicated non-linear filter (e.g., order statistics filter). The advantage of this system is that the filtering is done by processing the actual input data, rather than by an exhaustive template matching. In a standard 4 color c,m,y,k system, the RET Filter 30 is triggered by a jaggedness in the mask channel without regard for the actual color of the data—be it c,m,y,k or any combination thereof. When triggered, the RET Filter 30 signals the filters 31 through 34 to operate which will create the appropriate smoothing effect, without having to distinguish the different colors. It should be noted that filters 31 through 34 can potentially be different to take into account the different smoothing requirements for, say k and y. FIG. 2 illustrates the corresponding method for a printing system that does not enable a separate mask or tag channel. Here, Ink Filter 60 generates a binary "inking" signal from the Byte Stream 11. This binary data stream is again relayed to RET detection filter 30. RET filter 30 indicates the detection of jaggedness in the "ink" signal to filters 31 through 34 as in FIG. 1. FIG. 2 also shows the use of an optional halftoner 45 that can be used in either system of FIG. 2 or FIG. 1 in a like manner. RET filter 30 also signals jaggedness detection to the halftoner 45 switching the halftoner between a predetermined set of different halftone patterns. FIGS. 3 and 4 show two examples of the halftone pattern characteristics that can be used in the scenario of FIGS. 1 and 2. Here, the halftone dots in FIG. 3 are three different line screens, with a "normal", centered screen in (a) a "left bound" screen in (b) and a "right bound" screen in (c).

In cases where the RET filter does not indicate processing, the standard centered screen is used. In cases where the RET filter indicates processing one of the other two screens is used, where the screen in (b) is used for jagged lines that are smoothed on their right side by the RET operation and the screen in (c) is used for jagged lines that are smoothed on their left side. In order to indicate the difference between the two different sides of a line, it is obvious that the RET filter signal has to be expressive of more than two states. FIG. 4 shows an example, where a two-state (1-bit) RET filter signal is sufficient. In this case, no processing leads to the use of halftone screen (a) and signal, whereas screen (b) is used for cases that are indicates as processing by the RET filter. It should be noted that the halftone screens of FIGS. 3 and 4 are only meant as examples and other halftone screens can be used.

Figure 5:
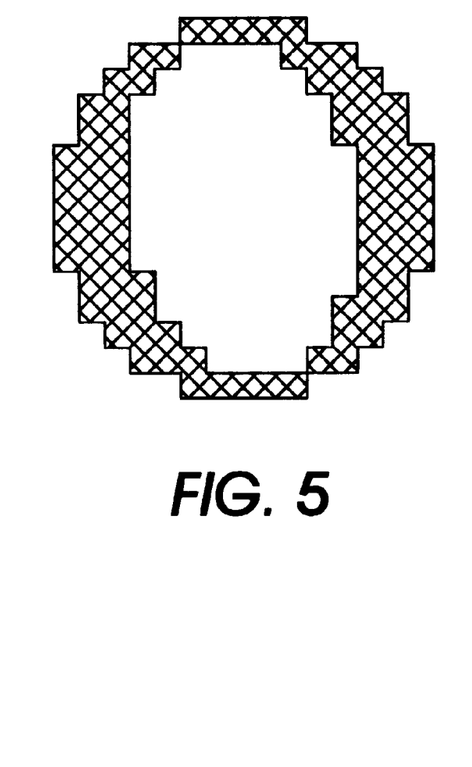
FIG. 5 is a binary bitmap.
Figure 6:
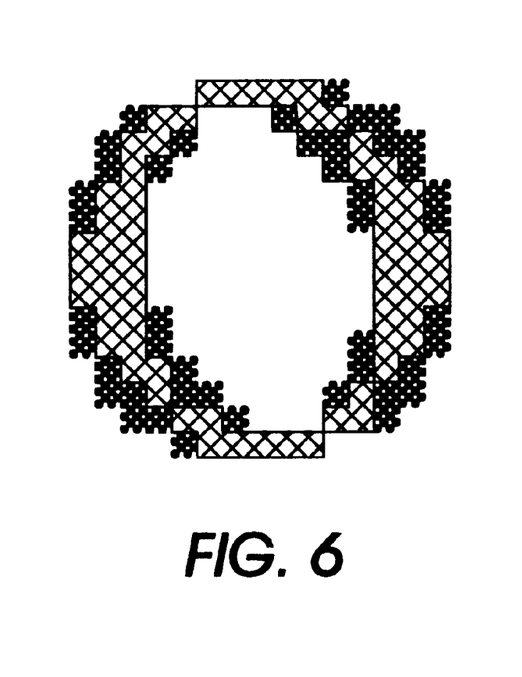
FIG. 6 is a generation of gray edged text from the binary bitmap of FIG. 5.
Figure 7:
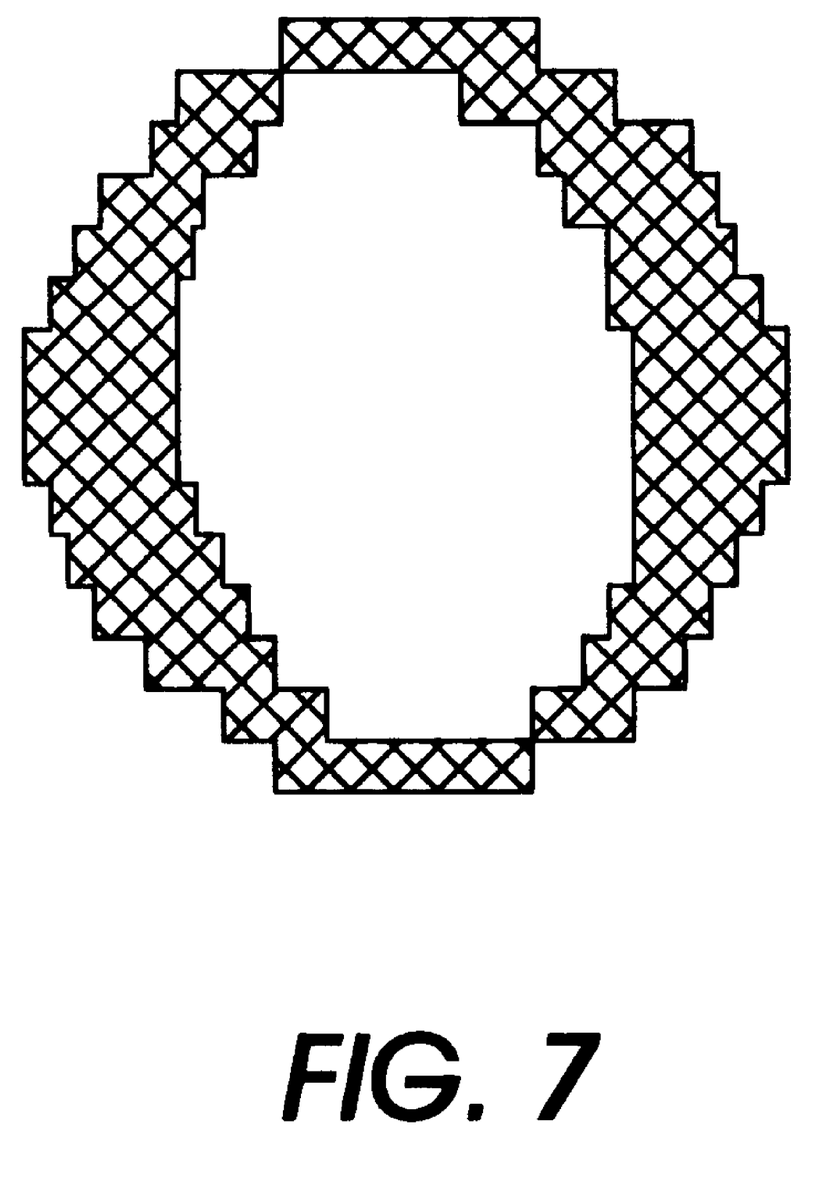
FIG. 7 is a generation of high addressability text using the Pulse Width Position Modulation (PWPM) from the bitmap of FIG. 5.

FIGS. 5 to 7 illustrate a magnified view of the performance of the algorithm. In FIG. 5, the original bitmap is shown coming into the algorithm @400 spi. This bitmap is either received from Multiplexer 10 of FIG. 1 or from Ink Filter 60 of FIG. 2. The bitmap of FIG. 5a is run through the RET circuitry (in this case a filter as described in U.S. Pat. No. 5,282,057 was used) and in contrast to standard RET applications, the output signal of the RET algorithm is used to switch a filter on or off.

For the simple example shown in FIG. 5, a 3×3 low-pass/ blurring filter was used, of the form:

$$\text{Filter} = \begin{array}{|c|c|c|} \hline 1 & 2 & 1 \\ \hline 2 & 4 & 2 \\ \hline 1 & 2 & 1 \\ \hline \end{array}$$

As can be seen from FIG. 5, the blurring filter was not active on the vertical and horizontal strokes, but only in jagged parts of the character. This allows the text to maintain its sharpness while simultaneously appearing less jagged. FIG. 7 shows the implementation where gray edges were generated on text. FIG. 6 shows the result of using the same input bitmap of FIG. 5, but is using halftoner 45 of FIG. 6 to generate the appropriately smoothed line thickness. As can be seen from FIG. 3, the proposed invention is applicable to gray writing (as in FIG. 1) and to high addressability PWPM writing (as in FIG. 2).

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

I claim:

1. A resolution enhancement method wherein input image data is provided in components, wherein at least two of said components are at different resolutions or bit depths, and wherein jaggie detection is first performed on a tagged set of said input data using a binary operation and wherein jaggie tag information resulting from said jaggie detection is then passed to an image enhancement means within and image processing system to indicate locations where image enhancement should be performed, and image enhancement is performed on said tagged data set based on said jaggie tag information.

2. The method of claim 1 wherein said jaggie detection is performed on said tagged data set using a binary operation and said jaggie tag information indicates to said image processing system locations where image filtering should be performed in a multiple bit per pixel format.

3. The method of claim 2 wherein:

input image data of said tagged image comprising a byte stream enters a mask FIFO through an ink filter and also enters data FIFOs;

pre-filters connected to said data FIFOs and a resolution enhancement filter receive jaggedness detection signals from said resolution enhancement filter;

said input image data is provided through a buffer to a image enhancement module where said resolution enhancement filter provides a signal to said image enhancement module indicating jaggedness detection requires a switch in said images halftone structure; and said image enhancement module processes said image data from said buffer under the direction of the resolution enhancement filter, resulting in enhanced image data.

4. The method of claim 3 wherein said image enhancement module is a halftoner module.

5. A method for resolution enhancement, comprising: separating the detection of image jaggedness from the processing required for smoothing said an image, wherein:

a) input image data enters a mask FIFO through a masking filter and also enters data FIFOs, wherein said input image data includes image components at different resolutions or bit depths;

b) a resolution enhancement filter connected to said data FIFOs receives said image input data;

c) image data is processed through a buffer to an image enhancement module wherein said resolution enhancement filter provides image jaggedness detection signals detected from said input image data, and wherein said image jaggedness detection signals signal said image enhancement module that said image input image data requires a switch in halftone structure; and d) said image enhancement module processes said image data from said buffer under the direction of the resolution enhancement filter, resulting in enhanced image data.

6. The method of claim 5 wherein image processing by said image enhancement module can be executed via established resolution enhancement techniques on a binary signal.

7. The method of claim 5 wherein said image enhancement module provides image smoothing which can operate on a full color 24 or 32 bit system.

8. The method of claim 5 wherein resolution enhancement techniques by said image enhancement module occur on multi-bit pixel depth data wherein separation is first conducted to detect image jaggedness and, secondly, smoothing operations are performed.

9. A system for resolution enhancement of images, comprising:

a) an input image data receiving means for receiving image data for jaggedness detection and smoothing, wherein said input image data is provided in a plurality of components and at least two of said components are at different resolutions or bit depths;

b) a jaggedness detection unit whose output signals an image enhancement unit of a need for enhancing or the absence of the need for enhancing of an image based on said input image data;

c) an image enhancement unit for providing image enhancement adjustments to said image based on input from said jaggedness detection unit; and d) a output buffer block wherein image data from said input image data means and any enhancements from said image enhancement unit are assembled into an output image format.

10. The system of claim 9 further comprising an enhancement filter which receives a jaggedness detection signal from said input image data wherein processed image data is passed through said output buffer to a halftone module where said image data is processed from buffer under control of the resolution enhancement filter based on said jaggedness detection.

* * * * *